(12) United States Patent
Fakoorian et al.

(10) Patent No.: US 11,863,321 B2
(45) Date of Patent: Jan. 2, 2024

(54) COVERAGE ENHANCEMENT AND SYSTEM EFFICIENCY BY UE

(71) Applicant: APPLE INC., Cupertino, CA (US)

(72) Inventors: Seyed Ali Akbar Fakoorian, Cupertino, CA (US); Chunhai Yao, Beijing (CN); Chunxuan Ye, San Diego, CA (US); Dawei Zhang, Cupertino, CA (US); Haitong Sun, Cupertino, CA (US); Hong He, Cupertino, CA (US); Oghenekome Oteri, San Diego, CA (US); Sigen Ye, Cupertino, CA (US); Wei Zeng, Cupertino, CA (US); Weidong Yang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 328 days.

(21) Appl. No.: 17/593,694

(22) PCT Filed: Oct. 9, 2020

(86) PCT No.: PCT/CN2020/120010
§ 371 (c)(1),
(2) Date: Sep. 22, 2021

(87) PCT Pub. No.: WO2022/073202
PCT Pub. Date: Apr. 14, 2022

(65) Prior Publication Data
US 2022/0311547 A1 Sep. 29, 2022

(51) Int. Cl.
*H04W 8/24* (2009.01)
*H04L 1/1607* (2023.01)
*H04L 1/08* (2006.01)

(52) U.S. Cl.
CPC .............. *H04L 1/1614* (2013.01); *H04L 1/08* (2013.01)

(58) Field of Classification Search
CPC ....... H04L 1/1614; H04L 1/08; H04L 1/1671; H04L 1/1825; H04L 1/1861; H04L 1/1864; H04L 1/189; H04L 1/1858; H04W 8/24
See application file for complete search history.

(56) References Cited

U.S. PATENT DOCUMENTS 9,112,692 B2 * 8/2015 Chen .................... H04B 7/0632
10,063,351 B2 * 8/2018 Blankenship ......... H04L 5/0039
(Continued)

FOREIGN PATENT DOCUMENTS

| CN | 109565839 A | 4/2019 |
| WO | 2017031675 A1 | 3/2017 |

(Continued)

OTHER PUBLICATIONS

WIPO, International Search Report and Written Opinion, PCT/CN2020/120010, dated Jun. 25, 2021, 9 pages.
(Continued)

*Primary Examiner* — Julio R Perez
(74) *Attorney, Agent, or Firm* — Dorsey & Whitney LLP

(57) ABSTRACT

A user equipment may use a soft acknowledgment/negative-acknowledgement (ACK/NACK) report to indicate a number of desired repetitions for Physical Downlink Shared Channel (PDSCH). In some embodiments, the user equipment may generate a soft ACK/NACK report that includes multiple bits. The multiple bits may be coded to indicate to a network node whether an allocated number of repetitions was sufficient, redundant or insufficient, and how many more repetitions are needed or desire by the UE.

20 Claims, 8 Drawing Sheets

(56) References Cited

U.S. PATENT DOCUMENTS

| | | | |
|---|---|---|---|
| 10,708,028 B2 * | 7/2020 | Nam | H04W 72/0446 |
| 11,019,623 B2 * | 5/2021 | Lee | H04W 74/0833 |
| 2018/0324774 A1 * | 11/2018 | You | H04W 72/0446 |
| 2022/0311547 A1 * | 9/2022 | Fakoorian | H04L 1/1614 |
| 2022/0353021 A1 * | 11/2022 | Park | H04L 1/1819 |
| 2023/0082998 A1 * | 3/2023 | Kim | H04W 74/0833 |
| | | | 370/329 |
| 2023/0135507 A1 * | 5/2023 | Taherzadeh Boroujeni | ........ |
| | | | H04L 1/001 |
| | | | 370/329 |

FOREIGN PATENT DOCUMENTS

| | | | |
|---|---|---|---|
| WO | 2020033640 A1 | 2/2020 | |
| WO | 2020033884 A1 | 2/2020 | |

OTHER PUBLICATIONS

Lenovo, "Indication of early PDSCH decoding success for Rel-13 eMTC", R1-156726, 3GPP TSG RAN WG1 Meeting #83, Anaheim, California, Agenda Item 6.2.1.4, Nov. 15-22, 2015, 5 pages.
Mediatek Inc., "Discussion on PUCCH functionality for Rel-13 MTC", R1-152114, 3GPP TSG-RAN WG1 Meeting #80Bbis, Belgrade, RS, Agenda Item 7.2.1.4, Apr. 20-24, 2015, 2 pages.

* cited by examiner

COVERAGE ENHANCEMENT AND SYSTEM EFFICIENCY BY UE

TECHNICAL FIELD

This application relates generally to wireless communication systems, and more specifically to techniques for user equipment to indicate a desired number of PDSCH repetitions.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gN)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Coverage is one of the key factors that an operator considers when commercializing cellular communication networks due to its direct impact on service quality as well as capital expenditure (CAPEX) and operating expense (OPEX). Despite the importance of coverage on the success of new radio (NPS) commercialization, a thorough coverage evaluation and a comparison with legacy RATs considering all NR specification details have not been done up to now.

Compared to Long Term Evolution (LTE), NR is designed to operate at much higher frequencies such as 28 GHz or 39 GHz in frequency range 2 (FR2). Furthermore, many countries are making available more spectrums on frequency range 1 (FR1), such as 3.5 GHz which is typically in higher frequencies than for LTE or 3G. Due to the higher frequencies, it is inevitable that the wireless channel will be subject to higher path-loss making it more challenging to maintain an adequate quality of service that is at least equal to that of legacy radio access technologies (RATs).

Embodiments herein describe systems, apparatuses, and methods for implementing coverage enhancements for NR using repetition and feedback from a user equipment. In some embodiments herein the UE uses a soft Acknowledgement/Negative Acknowledgement (ACK/NACK) report to indicate a desired number of repetitions for Physical Downlink Shared Channel (PDSCH) transmissions. In some embodiments herein a user equipment (UE) uses the soft ACK/NACK to indicate an increase to a number of symbols between the end of a PDSCH transmission and the start of a Physical Uplink Control Channel (PUCCH) transmission.

Various operations will be described as multiple discrete operations, in turn, in a manner that is most helpful in understanding the disclosure. The order of the description, however, should not be construed to imply that these operations are necessarily order dependent. In particular, these operations need not be performed in the order of presentation.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus the following detailed description of the embodiments of the systems and methods of the disclosure is not intended to limit the scope of the disclosure, as claimed, but is merely representative of possible embodiments.

Figure 1:
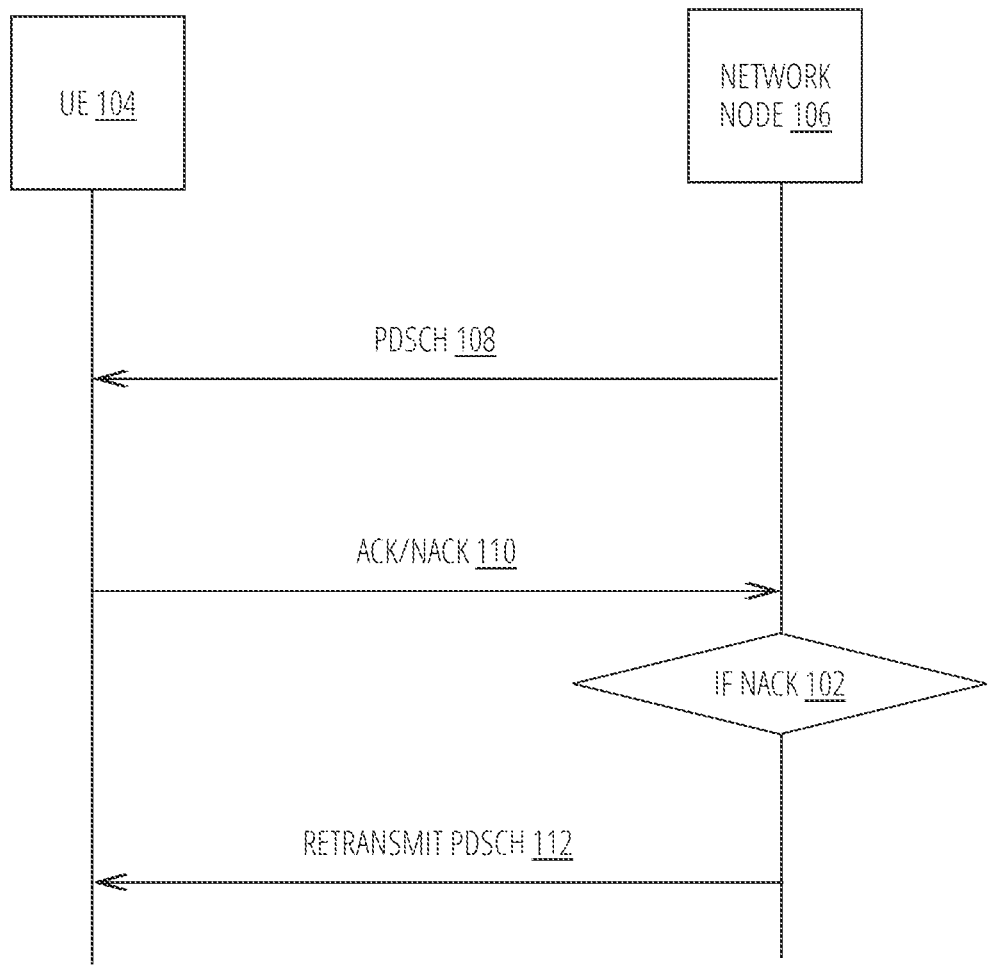
FIG. 1 is a simplified signal flow diagram of an example procedure for transmitting an ACK/NACK report in accordance with one embodiment.

FIG. 1 is a simplified signal flow diagram of an example procedure for transmitting an ACK/NACK report in accordance with one embodiment. As shown, a network node 106 (e.g., a Next Generation NodeB (gNB)) may transmit a downlink communication to a UE 104. The downlink communication may be PDSCH 108.

In some embodiments, the network node 106 transmits a bundle of PDSCH repetitions. The more repetitions that the network node 106 sends the more likely the UE 104 is to receive and be able to decode the PDSCH 108 thus improving coverage. However, repetitions conic at a cost of degradation of system efficiency.

Figure 2:
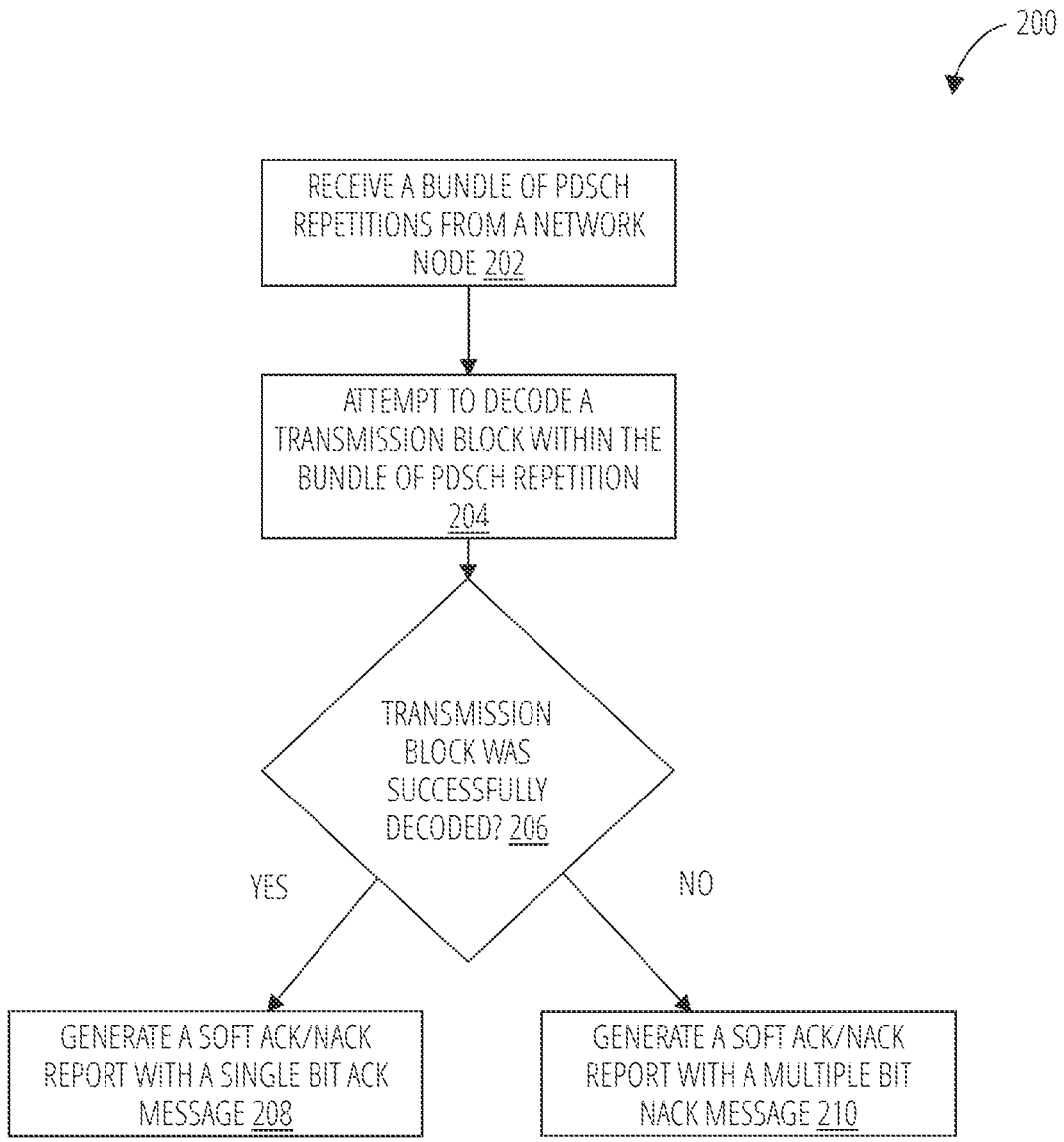
FIG. 2 is a flow diagram of a method for a UE to indicate a number of desired repetitions of a PDSCH in accordance with a first embodiment.
Figure 3:
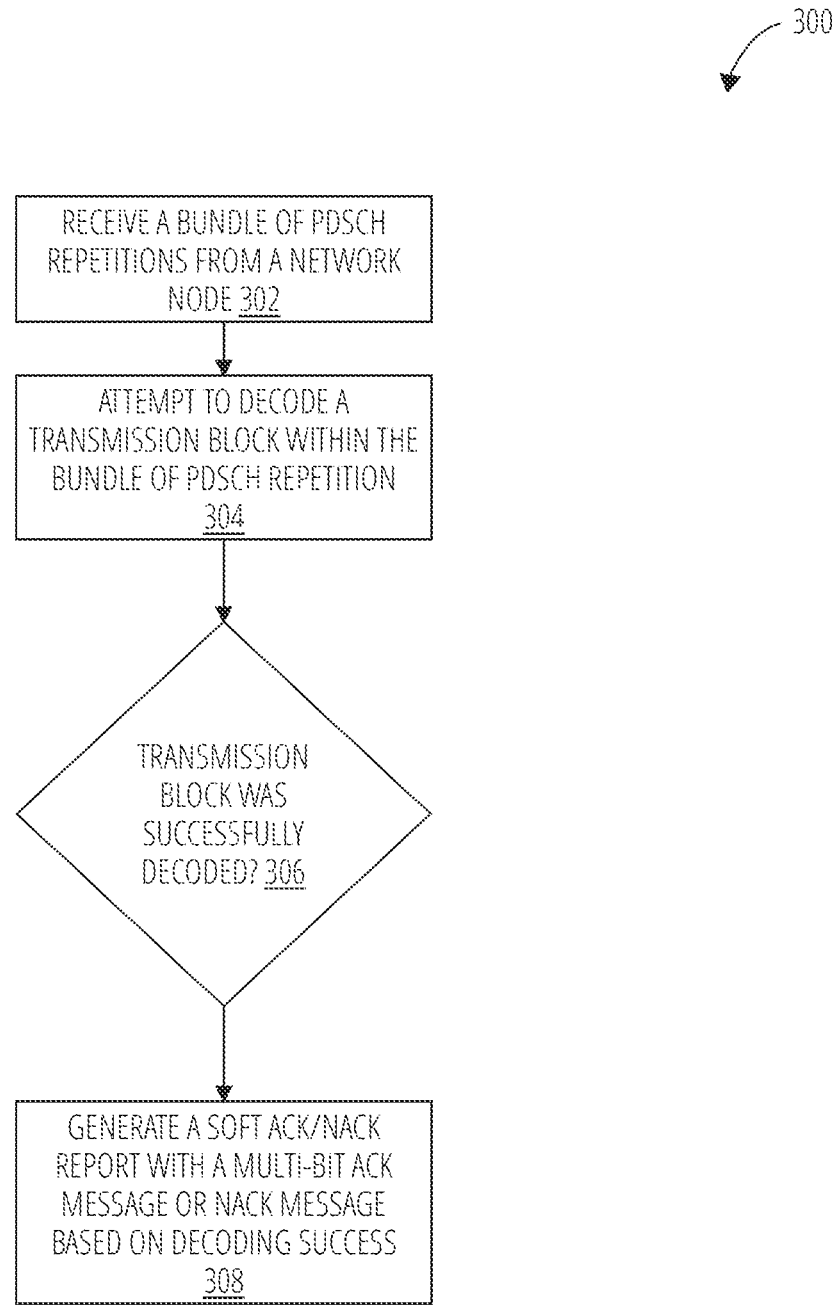
FIG. 3 is a flow diagram of a method for a UE to indicate a number of desired repetitions of a PDSCH in accordance with a second embodiment.

Embodiments herein balance coverage and efficiency by having the UE 104 transmit additional information in a soft ACK/NACK report 110. For example, the network node 106 may be set to transmit an initial number of repetitions of the PDSCH 108, and the UE 104 may indicate whether the initial number of repetitions was sufficient or not. If the initial number of repetitions is sufficient, the UE 104 includes an ACK message in the soft ACK/NACK report 110 indicating that the UE was able to successfully decode a transmission block within the PDSCH 108. If the initial number of repetitions is not sufficient, the UE 104 includes an ACK message in the soft ACK/NACK report 110 indicating that the UE was not able to decode a transmission block within the PDSCH 108, and requesting a desired number of additional repetitions in a retransmission. FIGS. 2-3 include additional details regarding embodiments in which the UE 104 indicates a desired number of repetitions.

The network node 106 determines if the soft ACK/NACK report 110 includes a NACK message. If NACK 102 is present, then the network node 106 retransmits PDSCH 112. The retransmitted PDSCH 112 includes the number of repetitions indicated in the NACK message as desired by the UE 104.

Figure 5:
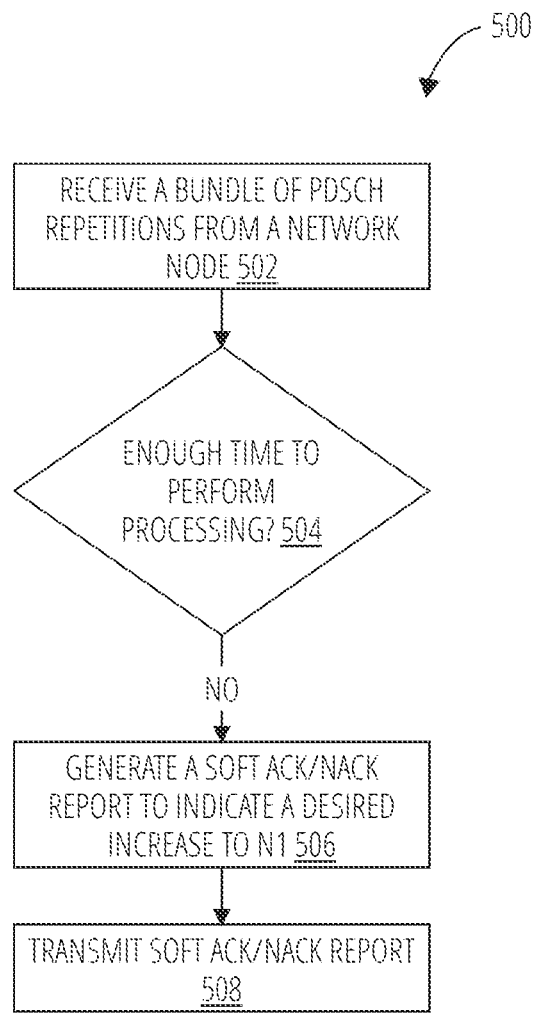
FIG. 5 illustrates a flow diagram of a method to indicate a desired increase to a number of symbols between the end of a PDSCH transmission and the start of a PUCCH transmission (N1) in accordance with one embodiment.

Additionally, in some embodiments the UE 104 may use the soft ACK/NACK report 110 to indicate an increase to a number of symbols between the end of a PDSCH transmission and the start of a PUCCH transmission (N1). If the network node 106 detects from the soft ACK/NACK report 110 an indication for increasing N1, the network node 106 may extend the time to make sure the UE 104 has enough time to perform processing. FIG. 5 includes additional details regarding a UE indicating a desire to increase N1.

FIG. 2 is a flow diagram of a method 200 for a UE to indicate a number of desired repetitions of a PDSCH in accordance with a first embodiment. For PDSCH repetitions, a UE using method 200 may provide soft ACK/NACK report instead of a single bit ACK/NACK for the bundle of repetitions. The soft ACK/NACK report may allow the UE to provide more information to a gNB on whether an allocated number of repetitions was sufficient, redundant or insufficient, and how many more repetitions are needed or desire by the UE.

In the illustrated embodiment, the UE receive 202 a bundle of PDSCH repetitions from a gNB. The UE may attempt 204 to decode a transmission block within the bundle of PDSCH repetitions. The UE may prepare a soft ACK/NACK report to inform the gNB of whether the UE was able to successfully decode 206 the transmission block, or if the UE needs the gNB to retransmit the PDSCH.

Additionally, the soft ACK/NACK report may include additional information indicating the whether the number of repetitious for the PDSCH was sufficient, redundant or insufficient, and how many more repetitions are needed or desire by the UE.

The format of the soft ACK/NACK report may depend on whether the transmission block was successfully decoded. Additionally, in some embodiments the ACK/NACK report may use different resources based on whether it is an acknowledge message or a negative acknowledge message.

For example, if the UE was able to successfully decode 206 the transmission block, the UE may generate 208 a soft ACK/NACK report with a single bit. For instance, when the UE is able to decode the transmission block within the bundle of PDSCH repetitions, the UE may generate and send a single bit ACK message on PUCCH resource A.

If the UE fails to decode the transmission block, the UE may generate 210 and send a soft ACK/NACK report with a multiple bit NACK message. For instance, the UE may send two or more bits instead of a single bit NACK message on PUCCH resource B. In some embodiments, the bits may be mapped to different code points indicating a number of additional repetitions desired by the UE to successfully decode the transmission block. The receiving the soft ACK HACK report may add the additional repetitions to the bundle of repetitions originally allocated for the PDSCH and retransmit the PDSCH so the UE may successfully decode the transmit block.

For example, a NACK message with two bits may use the two bits to indicate whether one, two, four, or eight more repetitions are needed or desired by the UE for a retransmission of the PDSCH. For instance, in some embodiments if the two bits are 00 then one more repetition is desired by the UE during a retransmission of the PDSCH; if the two bits are 01 then two more repetitions are desired by the UE during a retransmission of the PDSCH; if the two bits are 10 then four more repetitions are desired by the UE during a retransmission of the PDSCH; and if the two bits are 11 then eight more repetitions are desired by the UE during a retransmission of the PDSCH. In some embodiments, the bits may be mapped to different values of repetitions. In some embodiments, additional bits may be used.

Further, in some embodiments the bits may also or alternatively be used to indicate a desired redundancy version (RV) sequence and MCS modulation and coding scheme (TCS). The additional information provided by the bits may come at a cost of more complexity and larger uplink control information (UCI) payload, but may provide valuable information to the gNB.

In some embodiments, PUCCH resource A and B can be the same, meaning the gNB may need to go through different UCI payload hypothesis, rather than different PUCCH resources. For instance, rather than transmit the ACK message on resource A and the NACK message on resource b, the ACK message may be associated with a first hypotheses and the NACK message may be associated with a second hypotheses.

FIG. 3 is a flow diagram of a method 300 for a UE to indicate a number of desired repetitions of a PDSCH in accordance with a second embodiment. In this embodiment, the UE generates a soft ACK/NACK report that is multi-bit for both ACK and NACK messages. In other words, both ACK and NACK are mapped to one or more code points (i.e., a bit sequence). In this embodiment, a single PUCCH resource is used and the gNB does not need to go through different hypotheses.

For PDSCH repetitions, a UE using method 300 may provide soft ACK/NACK report instead of a single bit ACK/NACK for the bundle of repetitions. The soft ACK/NACK report may allow the UE to provide more information to a gNB on whether an allocated number of repetitions was sufficient, redundant or insufficient, and how many more repetitions are needed or desire by the UE.

In the illustrated embodiment, the UE receive 302 a bundle of PDSCH repetitions from a gNB. The UE may attempt 304 to decode a transmission block within the bundle of PDSCH repetitions. The UE may prepare a soft ACK/NACK report to inform the gNB of whether the UE was able to successfully decode successfully decode 306 the transmission block, or if the UE needs the gNB to retransmit the PDSCH. Additionally, the soft ACK/ACK report may include additional information indicating the whether the number of repetitions for the PDSCH was sufficient, redundant or insufficient, and how many more repetitions are needed or desire by the UE.

The UE may generate 308 a soft ACK/NACK report with a multi-bit ACK message or NACK message based on decoding success. For example, if the UE was able to successfully decode 306 the transmission block, the UE may generate 308 a soft ACK/NACK report with a multi-bit ACK message. If the UE fails to decode the transmission block, the UE may generate 308 and send a soft ACK/NACK report with a multi-bit NACK message. In some embodiments, the bits may be mapped to different code points indicating a number of additional repetitions desired by the UE to successfully decode the transmission block. The gNB receiving the soft ACK/NACK report may add the additional repetitions to the bundle of repetitions originally allocated for the PDSCH and retransmit the PDSCH so the UE may successfully decode the transmit block.

For example, a soft ACK/NACK report may include two bits. In some embodiments if the two bits are 00 then the bits correspond to a NACK indicating eight more repetitions are desired by the UE during a retransmission of the PDSCH; if the two bits are 01 then the bits correspond to a NACK indicating four more repetitions are desired by the UE during a retransmission of the PDSCH; if the two bits are 10 then the bits correspond to a NACK indicating two more repetitions are desired by the UE during a retransmission of the PDSCH; and if the two bits are 11 then the bits correspond to an ACK indicating that the transmission block was successfully decoded. In some embodiments, the bits may be mapped to different values of repetitions.

In some embodiments, additional bits may be used. With more bits, ACK may be mapped to different states, each state can indicate that the number of extra repetitions originally allocated was too many and also indicate a how many repetitions were extra repetitions and where not needed to decode the transmission block. For example, the bits may include code points that can indicate to the gNB that UE decoded the transmission block in just 2 repetitions.

Figure 4:
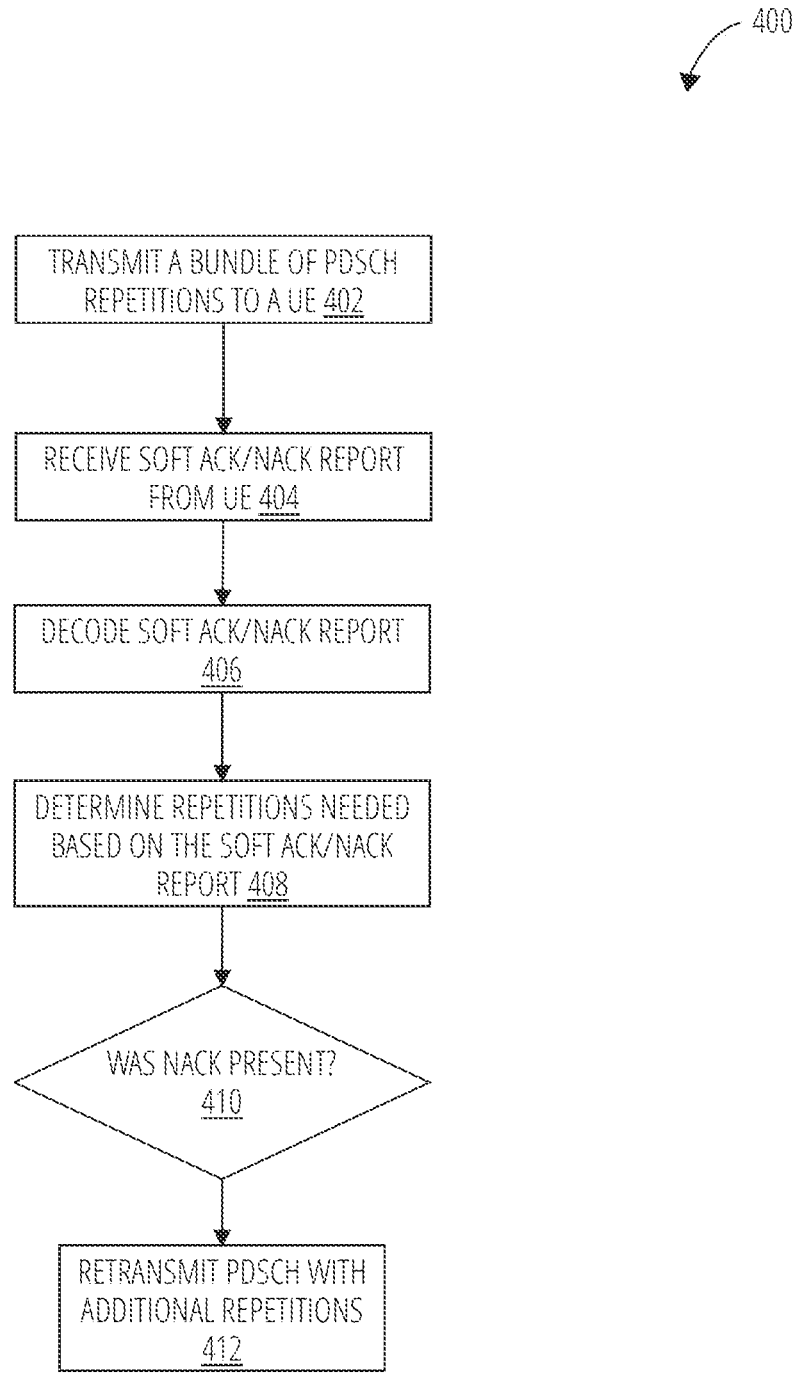
FIG. 4 is a flow diagram of a method for a gNB to determine a desired number of repetitions of a PDSCH in accordance with a one embodiment.

FIG. 4 is a flow diagram of a method 400 for a gNB to determine a desired number of repetitions of a PDSCH in accordance with a one embodiment. As illustrated, the gNB may transmit 402 a bundle of PDSCH repetitions to a UE. Based on whether or not the UE is capable of decoding a transmission block of the PDSCH, the UE may transmit a soft ACK/NACK report.

The gNB receives 404 the soft ACK/NACK report, and decodes 406 the soft ACK/NACK report. As described with reference to FIGS. 2 and 3, the soft ACK/NACK report may indicate whether an allocated number of repetitions was sufficient, redundant or insufficient, and how many more repetitions are needed or desire by the UE. The may use this information from the soft ACK/NACK report to determine 408 whether to maintain the number of repetitions, increase the number of repetitions, or decrease the number of repetitions for a future transmission of the PDSCH. For example, if a NACK is present 410 in the soft ACK/NACK report, the gNB may retransmit 412 the PDSCH with the number of additional repetitions indicated in the soft ACK/NACK report.

FIG. 5 illustrates a flow diagram of a method 500 for a UE to indicate a desired increase to a number of symbols between the end of a PDSCH transmission and the start of a PUCCH transmission (N1) in accordance with one embodiment. N1 represents the number of symbols between end of PDSCH and stat of PUCCH transmission. This number, N1 depends on the minimum subcarrier spacing (SCS) between PDCCH, PDSCH and PUCCH (min ($\mu$_PDCCH,$\mu$_PDSCH,$\mu$_UL)), and also depends on UE capability. The soft ACK/NACK report may indicate to increase N1, e.g. N1+d, where d>=0 based on UE capability. The purpose of the extra d is to make sure UE has enough time to perform required processing.

As shown, the UE may receive 502 the bundle of PDSCH repetitions from the gNB and determine 504 if there is sufficient time to perform the processing. If there is not sufficient time, the UE may generate 506 a soft ACK/NACK report to indicate a desired increase to N1. In some embodiments, to report the UE capability, the UE may report N1 only, d may be fixed in the specification (e.g., d is pre-programmed to equal 1 or 2 symbols). In some embodiments, UE reports N1 and d together (i.e., N1+d).

In some embodiments, several factors may impact the d value determination. For example, handling the soft A/N bits in the soft ACK/NACK report may impact the d value. In some embodiments, the repetition number estimation may impact the d value determination. The repetition number estimation is based on the processing of determining; effective signal-to-interference-plus-noise ratio (SINR) based on current receptions and mapping estimation of further required repetitions to fill the gap between effective SINR and desired SINR. A gNB receiving a soft ACK/NACK report that indicates to increase N1 may accordingly increase the number of symbols between end of PDSCH and stat of PUCCH transmission.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SW).

Figure 6:
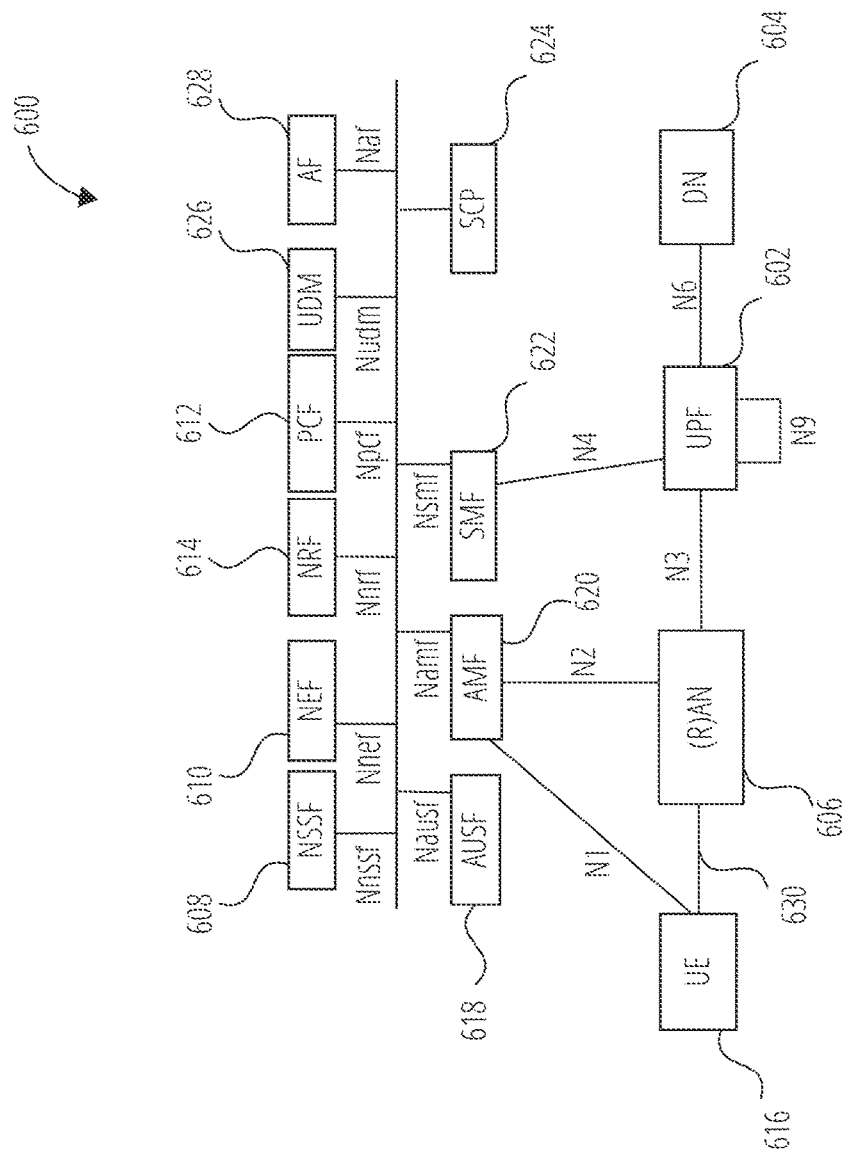
FIG. 6 illustrates an example service based architecture in accordance with certain embodiments.

FIG. 6 illustrates a service based architecture 600 in 5GS according to one embodiment. As described in 3GPP TS 23.501, the service based architecture 600 comprises NFs such as an NSSF 608, a NEF 610, an NRF 614, a PCF 612, a UDM 626, an AUSF 618, an AMF 620, an SMF 622, for communication with a UE 616, a (R)AN 606, a UPF 602, and a DN 604. The NFs and NF services can communicate directly, referred to as Direct Communication, or indirectly via a SCP 624, referred to as indirect Communication. FIG. 6 also shows corresponding service-based interfaces including Nutni, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 6 are described below.

The NSSF 608 supports functionality such as: selecting the set of Network Slice instances serving the UE determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 610 supports exposure of capabilities and events. NE capabilities and events may be securely exposed by the NEF 610 (e.g., for 3rd party, Application Functions, and/or Edge Computing). The NEF 610 may store/retrieve information as structured data using a standardized interface (Nudr) to a UDR. The NEF 610 may also secure provision of information from an external application to 3GPP network and may provide for the Application Functions to securely provide information to the 3GPP network (e.g., expected UE behavior, 5GLAN group information, and service specific information), wherein the NEF 610 may authenticate and authorize and assist in throttling the Application Functions. The NEF 610 may provide translation of internal-external information by translating between information exchanged with the AF and information exchanged with the internal network function. For example, the NEF 610 translates between an AF-Service-Identifier and internal 5G Core information such as DNN and S-NSSAI. The NEF 610 may handle masking of network and user sensitive information to external AF's according to the network policy. The NEF 610 may receive information from other network functions (based on exposed capabilities of other network functions), and stores the received information as structured data using a standardized interface to a UDR. The stored information can be accessed and re-exposed by the NEF 610 to other network functions and Application Functions, and used for other purposes such as analytics. For external exposure of services related to specific UE(s) the NEF 610 may reside in the FIPLMN. Depending on operator agreements, the NEF 610 in the HPLMN may have interface (s) with NF(s) in the VPLMN. When a LIE is capable of switching between EPC and 5GC, an SCEF+NEF may be used for service exposure.

The NRF 614 supports service discovery function by receiving an NF Discovery Request from an NF instance or SCP and providing the information of the discovered NF instances to the NF instance or SCP. The NRF 614 may also support P-CSCE discovery (specialized case of AF discovery by SMF), maintains the NF profile of available NE instances and their supported services, and/or notify about newly registered/updated/deregistered NE instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 612 supports a unified policy framework to govern network behavior. The PCF 612 provides policy rules to Control Plane function(s) to enforce them. The PCF 612 accesses subscription information relevant for policy decisions in a Unified Data Repository (UDR). The PCF 612 may access the UDR located in the same PLAIN as the PCF.

The UDM 626 supports generation of 3GPP AKA Authentication Credentials, User Identification Handling (e.g., storage and management of SUFI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping Sell/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 626 uses subscription data (including authentication data) that may be stored in a UDR, in which case a UDM implements the application logic and may not require an internal user data storage and several different UDMs may serve the same user in different transactions. The DM 626 may be located in the BPIMN of the subscribers it serves, and may access the information of the UDR located in the same PLMN.

The AF 628 interacts with the Core Network to provide services that, for example, support the following: application influence on traffic routing; accessing, the NEF 610; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 610 to interact with relevant Network Functions.

The AUSF 618 supports authentication for 3GPP access and untrusted non-3GPP access. The AUSF 618 may also provide support for Network Slice-Specific Authentication and Authorization.

The AMF 620 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LAU as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 620. Regardless of the number of Network functions, in certain embodiments there is only one NAS interface instance per access network between the UE and the CN, terminated at one of the Network functions that implements at least NAS security and Mobility Management. The AMF 620 may also include policy related functionalities.

In addition to the functionalities described above, the AMF 620 may include the following functionality to support non-3GPP access networks: support of N2 interface with N3IWF/TNGF, over which some information (e.g., 3GPP Cell identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the TIE for connectivity over non-3GPP access. Not all of the above functionalities may be required to be supported in an instance of a Network Slice.

The SMF 622 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local (male information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality handle local enforcement to apply QoS SLAs (VPLMN) charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 622 may include policy related functionalities.

The SCP 624 includes one or more of the following functionalities: Indirect Communication; Delegated Discovery; message forwarding and routing to destination NF/NF services: communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 624 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 616 may include a device with radio communication capabilities. For example, the UE 616 may comprise a smartphone (e.g., handheld touchscreen mobile computing devices connectable to one or more cellular networks). The LTE 616 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 616 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 616 may be configured to connect or communicatively couple with the (R)AN 606 through a radio interface 630, which may be a physical communication interface or layer configured to operate with cellular communication protocols such as a GSM protocol, a CDMA network protocol, a Push-to-Talk (PIT) protocol a PTT over Cellular (POC) protocol, a UMTS protocol, a 3GPP LTE protocol, a 5G protocol, a NR protocol, and the like. For example, the UE 616 and the (R)AN 606 may use a Uu interface (e.g., an LTE-Uu interface) to exchange control plane data via a protocol stack comprising a PRY layer, a MAC layer, an RLC layer, a PDCP layer and an RRC layer. A DL transmission may be from the (R)AN 606 to the UE 616 and a UL transmission may be from the UE 616 to the (R)AN 606. The UE 616 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 606 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 606 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell UEs in a Closed Subscriber Group (CSG), UEs for users in the home, etc.).

Although not shown, multiple RAN nodes (such as the (R)AN 606) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 616 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 602 may act as an anchor point for intra-RAT and inter-RAT mobility, external PDU session point of interconnect to the DN 604, and a branching point to support multi-homed PDU session. The UPF 602 may also perform packet routing and forwarding, packet inspection, enforce user plane part of policy rules, lawfully intercept packets (UP collection); traffic usage reporting, perform QoS handling for user plane (e.g., packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 602 may include an uplink classifier to support routing traffic flows to a data network. The DN 604 may represent various network operator services, Internet access, or third party services. The DN 604 may include, for example, an application server.

Figure 7:
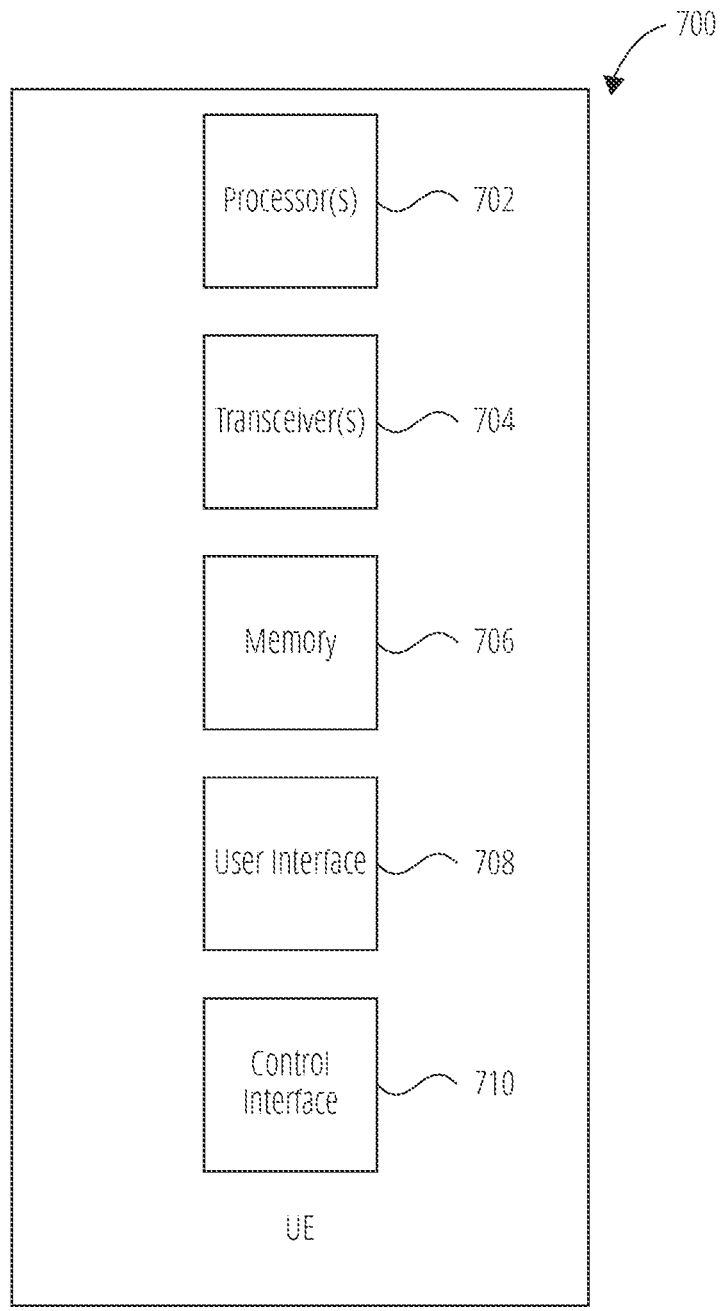
FIG. 7 illustrates a UE in accordance with one embodiment.

FIG. 7 is a block diagram of an example UE 700 configurable according to various embodiments of the present disclosure, including by execution of instructions on a computer-readable medium that correspond to any of the example methods and/or procedures described herein. The UE 700 comprises one or more processor 702, transceiver 704, memory 706, user interface 708, and control interface 710.

The one or more processor 702 may include, for example, an application processor, an audio digital signal processor, a central processing unit, and/or one or more baseband processors. Each of the one or more processor 702 may include internal memory and/or may include interface(s) to communication with external memory (including the memory 706). The internal or external memory can store software code, programs, and/or instructions for execution by the one or more processor 702 to configure and/or facilitate the UE 700 to perform various operations, including operations described herein. For example, execution of the instructions can configure the UE 700 to communicate using one or more wired or wireless communication protocols, including one or more wireless communication protocols standardized by 3GPP such as those commonly known as 5G/NR, LTE, LTE-A, UNITS, HSPA, GSM, CPRS, EDGE, etc., or any other current or future protocols that can be utilized in conjunction with the one or more transceiver 704, user interface 708, and/or control interface 710. As another example, the one or more processor 702 may execute program code stored in the memory 706 or other memory that corresponds to MAC, RLC, PDCP, and RRC layer protocols standardized by 3GPP (e.g., for NR and/or LTE). As a further example, the processor 702 may execute program code stored in the memory 706 or other memory that, together with the one or more transceiver 704, implements corresponding PHI layer protocols, such as Orthogonal Frequency Division Multiplexing (OFDM) Orthogonal Frequency Division Multiple Access (OFDMA), and Single-Carrier Frequency Division Multiple Access (SC-FDMA).

The memory 706 may comprise memory area for the one or more processor 702 to store variables used in protocols, configuration, control, and other functions of the UE 700, including operations corresponding to, or comprising, any of the example methods and/or procedures described herein. Moreover, the memory 706 may comprise non-volatile memory (e.g., flash memory), volatile memory (e.g., static or dynamic RAM), or a combination thereof. Furthermore, the memory 706 may interface with a memory slot by which removable memory cards in one or more formats (e.g., SD Card, Memory Stick, Compact Flash, etc.) can be inserted and removed.

The one or more transceiver 704 may include radio-frequency transmitter and/or receiver circuitry that facilitates the UE 700 to communicate with other equipment supporting like wireless communication standards and/or protocols. For example, the one or more transceiver 704 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 702. The RF circuitry may also include a transmit signal path Which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 704 includes a transmitter and a receiver that enable device 1200 to communicate with various 5G/NR networks according to various protocols and/or methods proposed for standardization by 3GPP and/or other standards bodies. For example, such functionality can operate cooperatively with the one or more processor 702 to implement a PHY layer based on OFDM, OFDMA, and/or SC-FDMA technologies, such as described herein with respect to other figures.

The user interface 708 may take various forms depending on particular embodiments, or can be absent from the UE 700. In some embodiments, the user interface 708 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 700 may comprise a tablet computing device including a larger touchscreen display. In such embodiments, one or more of the mechanical features of the user interface 708 may be replaced by comparable or functionally equivalent virtual user interface features (e.g., virtual keypad, virtual buttons, etc.) implemented using the touchscreen display, as familiar to persons of ordinary skill in the art. In other embodiments, the UE 700 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 700 having a touch screen display are capable of receiving user inputs, such as inputs related to exemplary methods and/or procedures described herein or otherwise known to persons of ordinary skill in the art.

In some exemplary embodiments of the present disclosure, the UE 700 may include an orientation sensor, which can be used in various ways by features and functions of the UE 700. For example, the UE 700 can use outputs of the orientation sensor to determine when a user has changed the physical orientation of the UE 700's touch screen display. An indication signal from the orientation sensor can be available to any application program executing on the UE 700, such that an application program can change the orientation of a screen display (e.g., from portrait to landscape) automatically when the indication signal indicates an approximate 90 degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 710 may take various forms depending on particular embodiments. For example, the control interface 710 may include an RS-232 interface, an RS-485 interface, a USB interface, an HDMI interface, a Bluetooth interface, an IEEE ("Firewire") interface, an I$^2$C interface, a PCMCIA interface, or the like. In some exemplary embodiments of the present disclosure, control interface 1260 can comprise an IEEE 802.3 Ethernet interface such as described above. In some embodiments of the present disclosure, the control interface 710 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 700 may include more functionality than is shown in FIG. 7 including, for example, a video and/or stall image camera, microphone, media player and/or recorder, etc. Moreover, the one or more transceiver 704 may include circuitry for communication using additional radio-frequency communication standards including Bluetooth, GPS, and/or others. Moreover, the one or more processor 702 may execute software code stored in the memory 706 to control such additional functionality. For example, directional velocity and/or position estimates output from a GPS receiver can be available to any application program executing on the UE 700, including various exemplary methods and/or computer-readable media according to various exemplary embodiments of the present disclosure.

Figure 8:
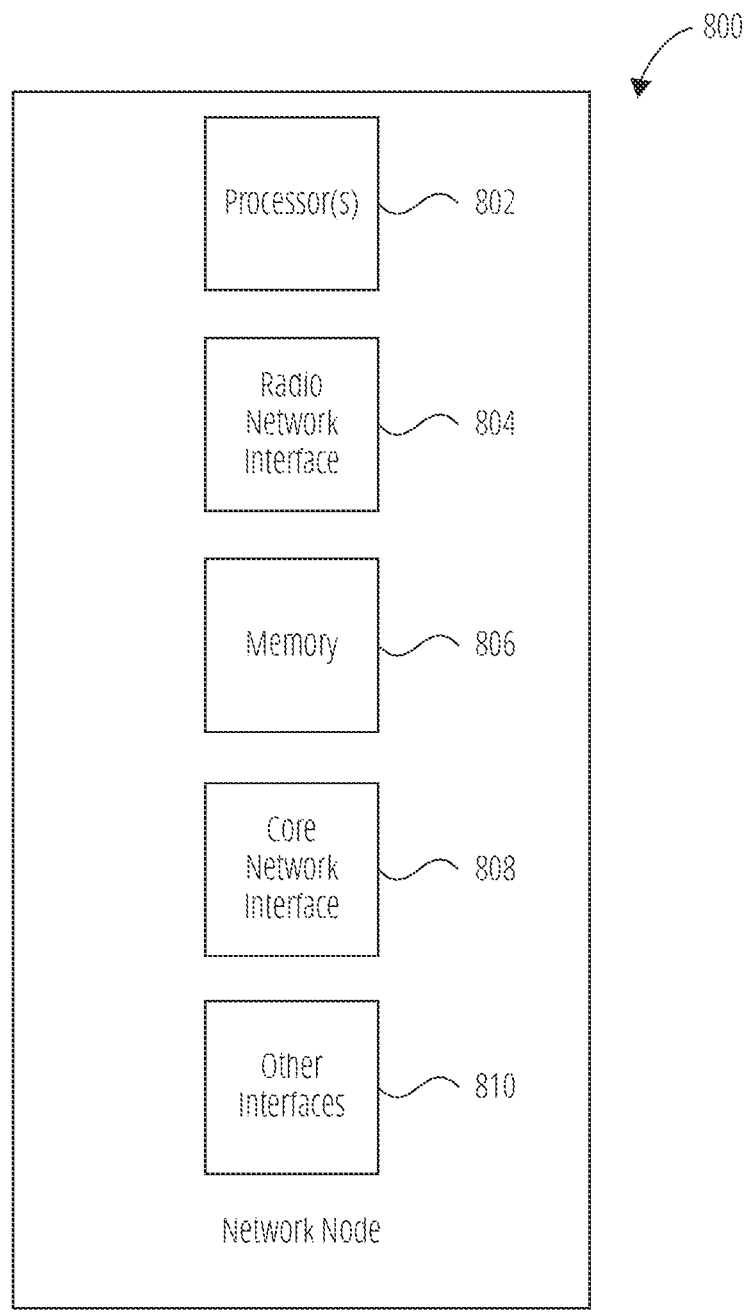
FIG. 8 illustrates a network node in accordance with one embodiment.

FIG. 8 is a block diagram of an example network node 800 configurable according to various embodiments of the present disclosure, including by execution of instructions on a computer-readable medium that correspond to any of the example methods and/or procedures described herein.

The network node 800 includes a one or more processor 802, a radio network interface 804, a memory 806, a core network interface 808, and other interfaces 810. The network node 800 may comprise, for example, a base station, eNB, gNB, access node, or component thereof.

The one or more processor 802 may include any type of processor or processing circuitry and may be configured to perform an of the methods or procedures disclosed herein. The memory 806 may store software code, programs, and/or instructions executed by the one or more processor 802 to configure the network node 800 to perform various operations, including operations described herein. For example, execution of such stored instructions can configure the network node 800 to communicate with one or more other devices using protocols according to various embodiments of the present disclosure, including one or more methods and/or procedures discussed above. Furthermore, execution of such stored instructions can also configure and/or facilitate the network node 800 to communicate with one or more other devices using other protocols or protocol layers, such as one or more of the PHY MAC, RLC, PDCP, and RRC layer protocols standardized by 3GPP for LTE, LTE-A, and/or NR, or any other higher-layer protocols utilized in conjunction with the radio network interface 804 and the core network interface 808. By way of example and without limitation, the core network interface 808 comprise an S1 interface and the radio network interface 804 may comprise a Uu interface, as standardized by 3GPP. The memory 806 may also store variables used in protocols, configuration, control, and other functions of the network node 800. As such, the memory 806 may comprise non-volatile memory (e.g., flash memory, hard disk, etc.), volatile memory (e.g., static or dynamic RAM), network-based (e.g., "cloud") storage, or a combination thereof.

The radio network interface 804 may include transmitters, receivers, signal processors, ASICs, antennas, beamforming units, and other circuitry that enables network node 800 to communicate with other equipment such as, in some embodiments, a plurality of compatible user equipment (UE). In some embodiments, the network node 800 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 804 may include a PHY layer based on OFDM, OFDMA, and/or SC-FDMA technologies. In some embodiments, the functionality of such a PHY layer can be provided cooperatively by the radio network interface 804 and the one or more processor 802.

The core network interface 808 may include transmitters, receivers, and other circuitry that enables the network node 800 to communicate with other equipment in a core network such as, in some embodiments, circuit-switched (CS) and/or packet-switched Core (PS) networks. In some embodiments, the core network interface 808 may include the S1 interface standardized by 3GPP. In some embodiments, the core network interface 808 may include one or more interfaces to one or more SGWs, MMPs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 808 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 810 may include transmitters, receivers, and other circuitry that enables the network node 800 to communicate with external networks, computers, databases, and the like for purposes of operations, administration, and maintenance of the network node 800 or other network equipment operably connected thereto.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 may include an apparatus comprising means to perform one or more elements of a method described in or related to any of the methods or processes described herein.

Example 2 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3 may include an apparatus comprising logic, modules, or circuitry to perform one or more elements of a method described in or related to any of the above Examples, or any other method or process described herein.

Example 4 may include a method, technique, or process as described in or related to any of the above Examples, or portions or parts thereof.

Example 5 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6 may include a signal as described in or related to any of the above Examples, or portions or parts thereof.

Example 7 may include a datagram, packet, frame, segment, protocol data unit (PDU), or message as described in or related to any of the above Examples, or portions or parts thereof, or otherwise described in the present disclosure.

Example 8 may include a signal encoded with data as described in or related to any of the above Examples, or portions or parts thereof, or otherwise described in the present disclosure.

Example 9 may include a signal encoded with a datagram, packet, frame, segment, PDU, or message as described in or related to any of the above Examples, or portions or parts thereof, or otherwise described in the present disclosure.

Example 10 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11 may include a computer program comprising instructions, wherein execution of the program by a processing element is to cause the processing element to carry out the method, techniques, or process as described in or related to any of the above Examples, or portions thereof.

Example 12 may include a signal in a wireless network as shown and described herein.

Example 13 may include a method of communicating in a wireless network as shown and described herein.

Example 14 may include a system for providing wireless communication as shown and described herein.

Example 15 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method for a user equipment (UE), comprising:
  receiving a bundle of Physical Downlink Shared Channel (PDSCH) repetitions from a network node;
  attempting to decode a transmission block within the bundle of PDSCH repetitions; and
  generating a soft acknowledgment/negative-acknowledgement (ACK/NACK) report based on whether the transmission block was successfully decoded,
    wherein when the transmission block is not successfully decoded the soft ACK/NACK report comprises a NACK message comprising multiple bits indicating a number of additional repetitions of the PDSCH needed to successfully decode the transmission block.

2. The method of claim 1, further comprising transmitting the soft ACK/NACK report to the network node.

3. The method of claim 2, wherein an ACK message is transmitted on PUCCH resource A and the NACK message is transmitted on PUCCH resource B.

4. The method of claim 3, wherein the ACK message is a single bit.

5. The method of claim 4, wherein the NACK message is two bits where the two bits are used to indicate whether one, two, four, or eight more repetitions are needed.

6. The method of claim 1, wherein soft ACK/NACK report comprises multiple bits, where:
  00 is the NACK message indicating that 8 more repetitions are needed;
  01 is the NACK message indicating that 4 more repetitions are needed;
  10 is the NACK message indicating that 2 more repetitions are needed; and
  11 is an ACK message.

7. The method of claim 1, further comprising reporting soft ACK/NACK capability to indicate an increase to a number of symbols between an end of a PDSCH transmission and a start of a PUCCH transmission.

8. A non-transitory computer-readable storage medium, the computer-readable storage medium including instructions that when executed by a user equipment (UE), cause the computer to:
  receive a bundle of Physical Downlink Shared Channel (PDSCH) repetitions from a network node;
  attempt to decode a transmission block within the bundle of PDSCH repetitions; and
  generate a soft acknowledgment/negative-acknowledgement (ACK/NACK) report based on whether the transmission block was successfully decoded,
    wherein when the transmission block is not successfully decoded the ACK/NACK report comprises a NACK message comprising multiple bits indicate a number of additional repetitions of the PDSCH needed to successfully decode the transmission block.

9. The computer-readable storage medium of claim 8, wherein the instructions further configure the computer to transmit the soft ACK/NACK report to the network node.

10. The computer-readable storage medium of claim 9, wherein an ACK message is transmitted on PUCCH resource A and the NACK message is transmitted on PUCCH resource B.

11. The computer-readable storage medium of claim 10, wherein the ACK message is a single bit.

12. The computer-readable storage medium of claim 11, wherein the NACK message is two bits where the two bits are used to indicate whether one, two, four, or eight more repetitions are needed.

13. The computer-readable storage medium of claim 8, wherein soft ACK/NACK report comprises multiple bits, where:
  00 is the NACK message indicate that 8 more repetitions are needed;
  01 is the NACK message indicate that 4 more repetitions are needed;
  10 is the NACK message indicate that 2 more repetitions are needed; and
  11 is an ACK message.

14. The computer-readable storage medium of claim 8, the soft ACK/NACK report indicates an increase to a number of symbols between an end of a PDSCH transmission and a start of a PUCCH transmission.

15. A user equipment (UE) comprising:
  a baseband processing unit; and
  a memory storing instructions that, when executed by the baseband processing unit, cause the apparatus to:
    receive a bundle of Physical Downlink Shared Channel (PDSCH) repetitions from a network node;
    attempt to decode a transmission block within the bundle of PDSCH repetitions; and generate a soft acknowledgment/negative-acknowledgement (ACK/NACK) report based on whether the transmission block was successfully decoded, wherein when the transmission block is successfully decoded the soft ACK/NACK report comprises an ACK message, and wherein when the transmission block is not successfully decoded the ACK/NACK report comprises a NACK message comprising multiple bits indicate a number of additional repetitions of the PDSCH needed to successfully decode the transmission block.

16. The UE of claim 15, further comprising transmitting the ACK message on PUCCH resource A, and transmitting the NACK message on PUCCH resource B.

17. The UE of claim 16, wherein the ACK message is a single bit.

18. The UE of claim 17, wherein the NACK message is two bits where the two bits are used to indicate whether one, two, four, or eight more repetitions are needed.

19. The UE of claim 15, wherein soft ACK/NACK report comprises multiple bits, where:
- 00 is the NACK message indicate that 8 more repetitions are needed;
- 01 is the NACK message indicate that 4 more repetitions are needed;
- 10 is the NACK message indicate that 2 more repetitions are needed; and
- 11 is the ACK message.

20. The UE of claim 15, the soft ACK/NACK report indicates an increase to a number of symbols between an end of a PDSCH transmission and a start of a PUCCH transmission.

* * * * *